US012762130B2

(12) United States Patent
Dixon et al.

(10) Patent No.: US 12,762,130 B2
(45) Date of Patent: Oct. 13, 2026

(54) DISTRIBUTED MULTI-SOURCE DATA PROCESSING AND PUBLISHING PLATFORM

(71) Applicant: Yext, Inc., New York, NY (US)

(72) Inventors: Thomas C. Dixon, Miami, FL (US); Robert Figueiredo, Miami, FL (US); Jacob Fancher, Miami, FL (US)

(73) Assignee: Yext, Inc., New York, NY (US)

( * ) Notice: Subject to any disclaimer, the term of this patent is extended or adjusted under 35 U.S.C. 154(b) by 137 days.

(21) Appl. No.: 17/167,631

(22) Filed: Feb. 4, 2021

(65) Prior Publication Data

US 2022/0245155 A1 Aug. 4, 2022

(51) Int. Cl.
*G06F 16/2455* (2019.01)
*G06F 16/2457* (2019.01)
*G06F 16/248* (2019.01)
*G06F 16/901* (2019.01)
*G06N 5/022* (2023.01)

(52) U.S. Cl.
CPC .. *G06F 16/24568* (2019.01); *G06F 16/24573* (2019.01); *G06F 16/248* (2019.01); *G06F 16/9024* (2019.01); *G06N 5/022* (2013.01)

(58) Field of Classification Search
CPC .......... G06F 16/24568; G06F 16/9024; G06N 5/022
See application file for complete search history.

(56) References Cited

U.S. PATENT DOCUMENTS 7,574,652 B2 8/2009 Lennon et al.
9,317,805 B1 * 4/2016 Fraenkel .................. G06N 5/02
9,342,622 B2 * 5/2016 Segaran ................ G06F 16/215
9,864,779 B2 * 1/2018 Barsness ................. H04L 65/65
10,262,078 B2 * 4/2019 Gu ...................... G06F 16/9024
10,831,509 B2 * 11/2020 Ravid ................. G06F 16/1794
11,442,920 B2 * 9/2022 Zang ................... G06F 16/9027
(Continued)

FOREIGN PATENT DOCUMENTS

EP 3557443 A1 10/2019
JP 2016085580 A 5/2016

OTHER PUBLICATIONS

PCT Notification of Transmittal Of The International Search Report And The Written Opinion Of The International Searching Authority for PCT Application No. PCT/US2022/14249, mailed May 25, 2022, 16 pages.

(Continued)

*Primary Examiner* — Sherief Badawi
*Assistant Examiner* — J Mitchell Curran
(74) *Attorney, Agent, or Firm* — Jeffri A. Kaminski; Venable LLP

(57) ABSTRACT

A system and method to manage a data graph including data associated with a user system. The system and method receive multiple input document streams from multiple different data sources. A first document is identified from one of the multiple input document streams, the first document having a first schema including data associated with the user system. The first document is transformed from the first schema to a second schema to generate a first transformed document including at least a portion of the data. The portion of the data of the transformed first document is merged into the data graph stored in a graph database.

16 Claims, 7 Drawing Sheets

(56) References Cited

U.S. PATENT DOCUMENTS

| | | | |
|---|---|---|---|
| 2010/0250497 | A1 | 9/2010 | Redlich et al. |
| 2019/0075134 | A1 | 3/2019 | Ylonen |

OTHER PUBLICATIONS

International Preliminary Report on Patentability Chapter I in corresponding International Application No. PCT/US2022/014249 dated Aug. 3, 2023 (7 pages).

Extended European Search Report in corresponding European Application No. 22750211.9 dated Feb. 21, 2025 (11 pages).

Ahmad F. Subahi et al; "An Intelligent IoT-Based System Design for Controlling and Monitoring Greenhouse Temperature"; IEEE Access, IEEE, USA; vol. 8; Jul. 8, 2020; pp. 125488-125500; DOI: 10.1109/ACCESS.2020.3007955 (13 pages).

* cited by examiner

DISTRIBUTED MULTI-SOURCE DATA PROCESSING AND PUBLISHING PLATFORM

TECHNICAL FIELD

Embodiments of the disclosure are generally related to data processing and publishing, and more specifically, are related to a distributed data processing and publishing platform associated with data collected from multiple data sources.

BACKGROUND

Conventionally, a company may maintain a website or web application to publish information about the company to end user systems (e.g., customers or prospective customers). To provide an optimal experience for end user-systems, the company seeks to maintain updated and accurate data about the company that can be efficiently published to the end user-system in response to an end-user system action (e.g., a search query, an interaction with a portion of the company webpage, etc.). In this regard, the published output of data can take many different forms and formats. Furthermore, different companies may wish to customize or tailor their company-related data to generate one or more different outputs for provisioning to an end user.

A data management system may be employed to collect and publish data on behalf of the company based on data received from a data source associated with the company. However, the use of a company-specific data source to collect data for publication to an end user system limits the company's ability to publish complete, accurate and updated data from other data sources in a structured format that is customizable by the company and adaptable to multiple different publication formats.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
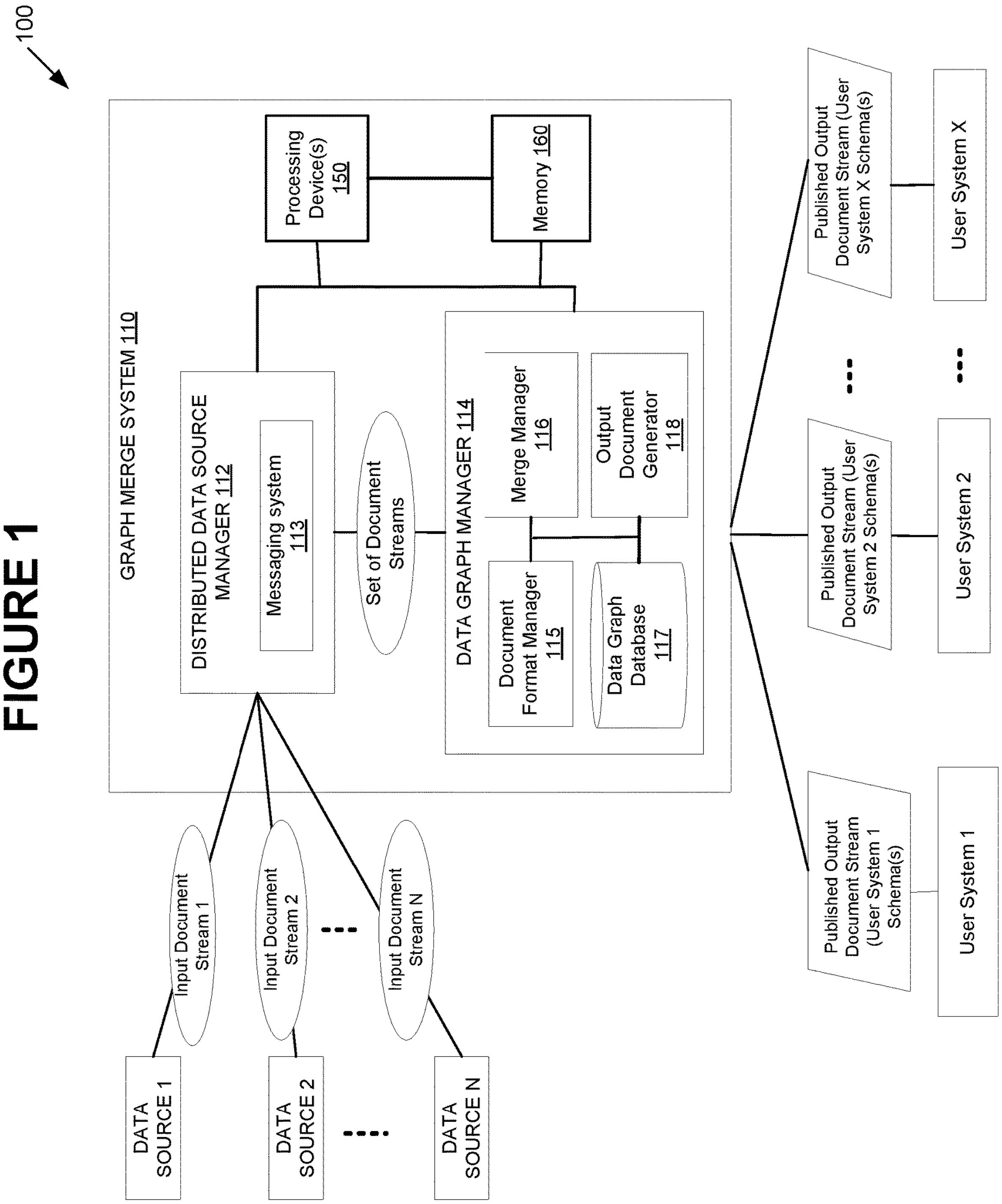
FIG. 1 illustrates an example of a computing environment including a graph merge system to manage graph nodes including data associated with a user system, in accordance with one or more aspects of the disclosure.

Aspects of the present disclosure relate to a method and system to process one or more input streams of documents (i.e., an electronic unit of data that can be electronically transmitted and stored) from one or more data sources and merges the document data into a persistent graph database (e.g., a database using graph structures for semantic queries with nodes, edges and properties to represent and store data and data relationships). Embodiments of the disclosure address the above-mentioned problems and other deficiencies with current data management system technologies by providing a document and graph database management system (also referred to as a "graph merge system") to manage a data structure (also referred to as a "data graph", "user data graph", "knowledge graph" or a "user knowledge graph") including elements of structured data corresponding to the set of documents associated with a user system. In an embodiment, a user knowledge graph is generated, managed, and updated in the graph database by the graph merge system based on multiple disparate document sources providing individual input document streams.

In an embodiment, the graph merge system receives and processes input data stream messages from the multiple data sources. In an embodiment, the graph merge system performs logical merge operations to merge the messages including respective input documents containing data associated with a user system. In an embodiment, results of the merge operations (herein "merged document data" is persisted or stored in the user knowledge graph in the graph database. In an embodiment, the merged document data can include data corresponding to respective fields of the input document message.

In an embodiment, the graph merge system generates steams of output documents based on the data maintained in the user knowledge graph. In an embodiment, the graph merge system identifies and selects one or more updates to the data to be incorporated as part of the output document publication stream. In an embodiment, the graph merge system can manage multiple different output formats that are customizable by multiple different user systems. For example, the graph merge system can maintain and manage a first set of output formats (e.g., outputs generated based on the data from the user knowledge graph and published by the graph merge system in accordance with a customized format or schema selected by a user system) on behalf of a user system. In an embodiment, the graph merge system can identify one or more fields of a user system output schema for which data has been updated. Upon identifying a field of the output schema to be updated, the graph merge system can update the field and publish the output.

In an embodiment, the graph merge system can analyze the fields of the output schema associated with a user system and determine that no fields of the schema are associated with updated data as maintained in the data graph associated with the user system. In this embodiment, since the fields of the output schema are not subject to an update, the graph merge system can suppress the publication of the output to the user system. Accordingly, the graph merge system can further identify and select one or more updates to the data that are to be suppressed or filtered from the output document publication stream. Advantageously, the graph merge system can publish a document including updated data in a user system selected schema via the output stream in response to determining that the updated data relates to one or more fields of the user system selected output schema. In addition, the graph merge system can suppress the publication of one or more updates in response to determining that the updated data does not relate to the fields of the user system selected output schema, thereby reducing the computational expense associated with additional updating and publication.

FIG. 1 illustrates an example computing environment 100 including a graph merge system 110 communicatively connected to one or more data sources (e.g., data source 1, data source 2 . . . data source N) and one or more user systems (e.g., user system 1, user system 2 . . . user system X). The graph merge system 110 provides a distributed data graph (also referred to as a "data graph" "knowledge graph" or "user data graph") publishing platform. The graph merge system 110 receives input document streams (e.g., input document stream 1, input document stream 2 . . . input document stream N) from the one or more data sources. The graph merge system 110 merges the data of the multiple input document streams into a corresponding user data graph for the respective user systems (e.g., user system 1, user system 2 . . . user system N) that is persisted in a database (e.g., data graph database 117) of the graph merge system 110. For example, the user systems may be any suitable computing device (e.g., a server, a desktop computer, a laptop computer, a mobile device, etc.) associated with a user system (e.g., a company) associated with a data graph managed and maintained by the graph merge system 110.

According to embodiments, the graph merge system 110 manages the user knowledge graphs based on the input data streams from the disparate data sources and generates output document streams for publication to the respective user systems for provisioning to one or more end-user systems (not shown). As used herein, the term "end-user" refers to one or more users operating an electronic device (e.g., end-user system 1) to submit a request for data (e.g., a webpage request, a search query, etc.) to a user system (e.g., user system 1, user system 2 . . . user system X).

In an embodiment, the graph merge system 110 generates a published output document stream in accordance with schemas established by each of the user systems. The published output document stream includes multiple documents (e.g., having multiple document types) that are formatted in accordance with the user-system schema to enable the output of data to the end-user systems (e.g., in response to a search query from an end-user system). In an embodiment, document types can include, but are not limited to, an entity type (e.g., a document including data associated with an entity (e.g., a person, a store location, etc.) associated with the user system, a listings type (e.g., a document including data associated with a review associated with a user system), and a review type (e.g., a document including data relating to a review associated with a user system)

The graph merge system 110 may be communicatively connected to the user systems via a suitable network. In an embodiment, the graph merge system 110 may be accessible and executable on one or more separate computing devices (e.g., servers). In an embodiment, the graph merge system 110 can transmit a file including a dataset associated a published output document stream to a user system on a periodic basis. In an embodiment, the graph merge system 110 can send a notification to a user system, where the notification is associated with an update to the published output document stream. According to embodiments, the graph merge system 110 may be communicatively coupled to a user system via any suitable interface or protocol, such as, for example, application programming interfaces (APIs), a web browser, JavaScript, etc. In an embodiment, the graph merge system 110 includes a memory 160 to store instructions executable by one or more processing devices 150 to perform the instructions to execute the operations, features, and functionality described in detail herein.

According to embodiments, the graph merge system 110 can include one or more software and/or hardware modules to perform the operations, functions, and features described herein in detail, including a distributed data source manager 112 including a messaging system 113, a data graph manager 114 including a document format manager 115, a merge manager 116, a data graph database 117, and a output document generator 118, the one or more processing devices 150, and the one or more memory devices 160. In one embodiment, the components or modules of the graph merge system 110 may be executed on one or more computer platforms of a system associated with an entity that are interconnected by one or more networks, which may include a wide area network, wireless local area network, a local area network, the Internet, etc. The components or modules of the graph merge system 110 may be, for example, a hardware component, circuitry, dedicated logic, programmable logic, microcode, etc., that may be implemented in the processing device of the knowledge search system.

In an embodiment, the distributed data source manager 112 includes a messaging system 113 configured to receive input document streams from multiple data sources (e.g., data source 1, data source 2 . . . data source N). The input document streams include one or more document messages including one or more documents (e.g., a file or other data object that can be electronically transmitted and stored) including data relating to a user system having a data graph managed by the data graph manager 114 of the graph merge system 110. In an embodiment, the messaging system 113 may include a messaging layer configured to read one or more document messages of the input document streams received from the multiple data sources (e.g., data sources such as a software as a service (SAAS) platform, Google™, Yelp™, Facebook™, Bing™, Apple™, Salesforce™, Shopify™, Magento™, a user system (e.g., a source of data relating to a user system that is managed and maintained by the user system), or and other search service providers). In an embodiment, one or more messaging channels are established with the respective data sources to enable transmission of the document messages of the input document streams that are received and processed by the distributed data source manager 112 of the graph merge system 110.

In an embodiment, the messaging system 113 can be configured to receive input document streams from one or more suitable messaging platforms. For example, the messaging system 113 can be configured to interact with a publish-subscribe based messaging system configured to exchange data between processes, application, and servers (e.g., the Apache Kafka® distributed streaming platform). In an embodiment, the messaging system 113 is configured to interact with a publish and subscribe based messaging system to receive the document input streams. In an embodiment, the messaging system 113 is configured to receive document input streams from one or more clusters of servers of the messaging system. In an embodiment, a cluster of the messaging system is configured to store streams of document messages organized or grouped according to a parameter (e.g., a topic), where each document message is associated with identifying information (e.g., a key, a value, and a timestamp). In an embodiment, the topic can be a category or document stream feed name to which document messages (or records) are published.

In an embodiment, the messaging system 113 can include a listener module configured to listen for document updates in the multiple data sources. In an embodiment, the messaging system 113 can be configured to process the document messages in any suitable fashion, including processing the messages from one or more message queues in a serial manner, processing updates incrementally (e.g., in batches of documents at predetermined time intervals), etc.

In an embodiment, the distributed data source manager 112 is configured to provide an interface to the data graph manager 114 via which the documents streams (e.g., a set of document streams corresponding to the input document streams received from the data sources). are transmitted. In an embodiment, the distributed data source manager 112 is configured to adapt the documents received from the data sources to the set of document streams including document records containing data updates or information identifying document records to be deleted. In an embodiment, the distributed data source manager 112 can refresh the data from the data sources to identify data updates and synchronize the document streams following a configuration change. In an embodiment, the distributed data source manager 112 can maintain and apply a set of stream rules that identify one or more fields of the documents that are to be monitored for purposes of transmitting to the data graph manager 114 for further processing. In an embodiment, example fields include, but are not limited to, a name field, a project field, a source field, a type field, an account field, a subaccount field, a filter field, a label field, etc. In an embodiment, the distributed data source manager 112 applies the stream rules to identify a set of data from the documents corresponding to at least the fields identified by the one or more stream rules.

In an embodiment, the document format manager 115 of the data graph manager 114 can perform one or more input transformation functions with respect to the document messages received from the multiple data sources. In an embodiment, the document format manager 115 maintains and applies one or more input transform functions representing instructions regarding processing of an incoming document message according to one or more transformation definitions (e.g., a default transformation definition, a transformation corresponding to an arbitrary data-interchange format that provides an organized, human-readable structure (e.g., a JSON transformation), etc.). In an embodiment, the input transformation function can include a defined schema for formatting the data included in the document message received via the input document streams. The transformed document messages (e.g., the result of the input transformation function) establish a uniform or defined input schema (e.g., organized set of fields and corresponding data values) for further processing by the data graph manager 114.

In an embodiment, the merge manager 116 receives the set of transformed document streams (provided by the multiple different data sources) and merges the multiple streams of documents for incorporation into a corresponding user data graph stored in a data graph database 117. In an embodiment, the data graph manager 114 merges the data of the transformed input document into the corresponding nodes of the user data graph. In an embodiment, the input data document received from a data source (e.g., in a format defined by the data source) is parsed to enable transformation into the transformed document schema where each document includes one or more graph key properties which identify a corresponding node or relationship in a user data graph. In an embodiment, the one or more graph key properties provide information to identify a graph node in accordance with one or more attributes (e.g., an authority attribute identifying who is responsible for the key, a stability attribute enabling older systems to refer to newer data, a uniqueness context attribute, an opacity attribute, etc.).

In an embodiment, the data graph manager 114 performs the merge function by fetching an existing document graph node corresponding to the identified graph key. In an embodiment, the input document can be parsed or broken down into multiple different components such as a set of one or more field-values that are to be updated, a set of one or more graph edges to create or update corresponding to reference-type values, and metadata corresponding to the data source of the document message. In an embodiment, the data graph manager 114 uses the parsed or identified portions of the document message to generate or update a graph node to merge the data into the data graph associated with a user system (e.g., an entity).

Figure 2:
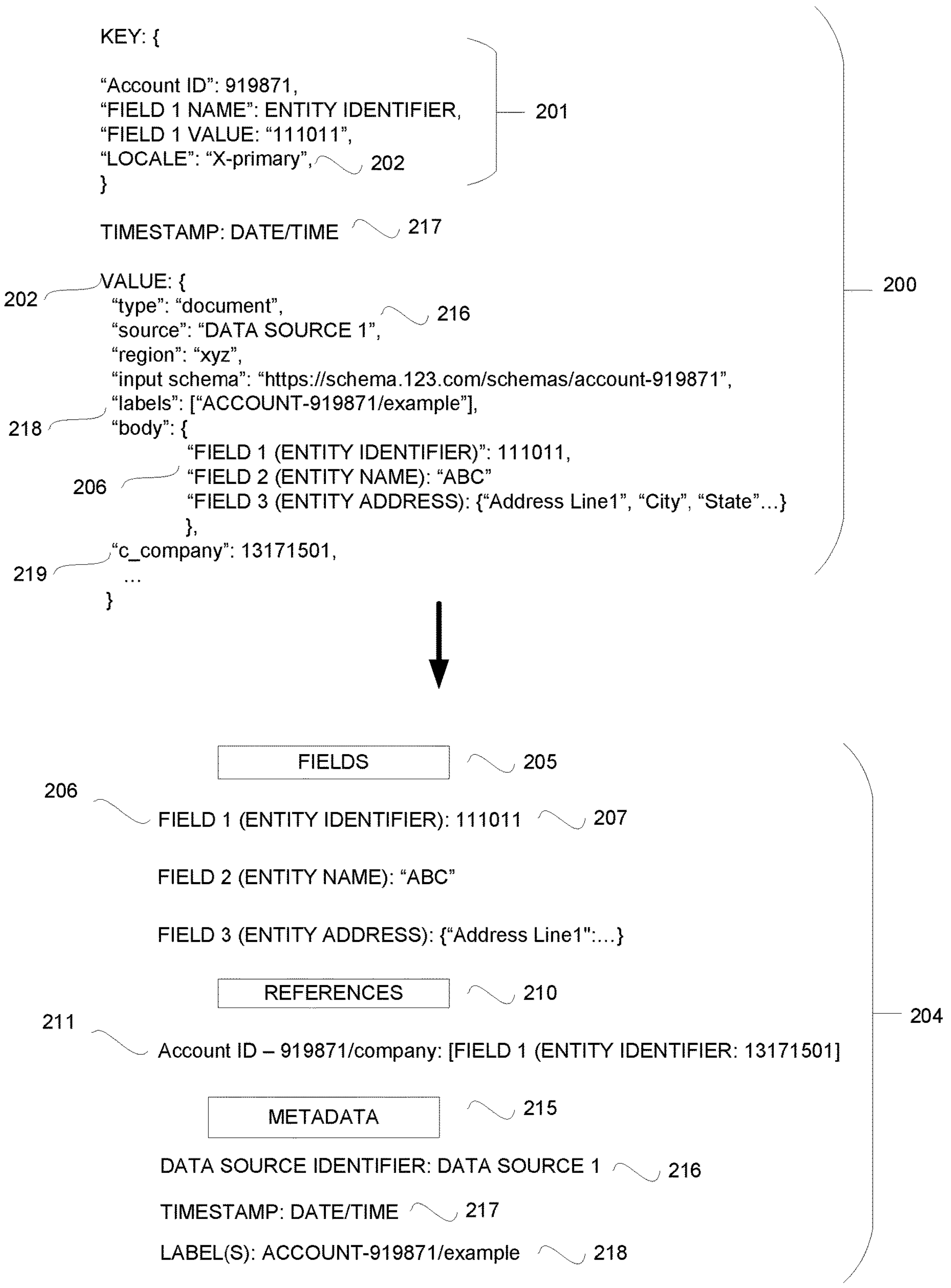
FIG. 2 illustrates an example input document message and identified portions processed and managed by a graph merge system, in accordance with one or more aspects of the disclosure.

FIG. 2 illustrates an example of an input document message 200 processed by the graph merge system, in accordance with embodiments of the present disclosure. As shown in FIG. 2, the input document message 200 received by the graph merge system from a data source (e.g., Data Source 1 in the example shown in FIG. 2) includes a graph key portion 201, a timestamp portion 217 (e.g., metadata identifying a data and time associated with the input document message), and a "value" portion 202 including other metadata (e.g., label data 218, a data source identifier 216, etc.) and a set of field/value pairs (e.g., Field 1 (Entity Identifier): Value 1 (e.g., "111011"; Field 2 (Entity Name): Value 2 (e.g., "ABC Corp."), and Field 3 (Entity Address): Value 3 ("Address Line 1", "City", "State" . . . ).

In an embodiment, as shown in FIG. 2, the input document message 200 can include information identifying the input transformation schema to be applied. In an embodiment, the "input schema" field identifies a pointer or web-based location (e.g., a URL) corresponding to the input transformation schema that is to be applied to transform the schema of the document message for input and processing by the graph merge system (e.g., the schema of the data to be processed during the merge processing).

In an embodiment, the input document message 200 can include locale identifier 202 in the graph key portion. In an embodiment, the locale identifier 202 can identify a locale that can be stored with each field and reference in the data graph, allowing the value of a field or target node of a reference to vary by locale for a single node of the data graph. In an embodiment, the locale identifier can include information identifying one or more of a language and country. In an embodiment, a local identifier can identify a primary locale (e.g., "x-primary", where the prefix "x" indicates a private use tag, as shown in FIG. 2). In an embodiment, each input document message is associated with a single locale that is part of the key to enable documents about the same object but in different locales to be maintained as separate records (e.g., not compacted together).

In an embodiment, the graph merge system identifies and fetches an existing document graph node based on the information in the graph key (e.g., the Entity Identifier value: 111011). In an embodiment, if an existing graph node is not identified, the graph merge system can initialize a new graph node using the graph key information.

In an embodiment, the graph merge system parses the input document message 200 to identify a set of portions of the document message to be used to merge the data of an input document message into a data graph associated with the entity. As shown in FIG. 2, a set of components or portions 204 of the input document 200 are parsed to identify a "fields" portion 205 corresponding to the one or more fields (e.g., Field 1 (Entity Identifier) 206) and the corresponding value (e.g., value 207 corresponding to field 206) that are to be updated in the graph node, a "references" portion 210 identifying one or more graph edges 211 to create or update (e.g., a graph edge to associate the graph node being merged to an existing graph node (e.g., a graph node corresponding to entity identifier: 1371501), and a "metadata" portion 215 corresponding to metadata relating to the data source of the document message.

In an embodiment, the merging operation can include combining fields based on the graph key corresponding to a document. In an embodiment, all documents having a same graph key have their respective fields added to the same graph node. In an embodiment, the schema may be used to determine which fields are to be present in a respective document (e.g., where the schema is specified per document). In an embodiment, any suitable schema may be employed, including a static schema or a schema that is based on a particular field type (e.g., a per-entity-type schema).

Figure 3:
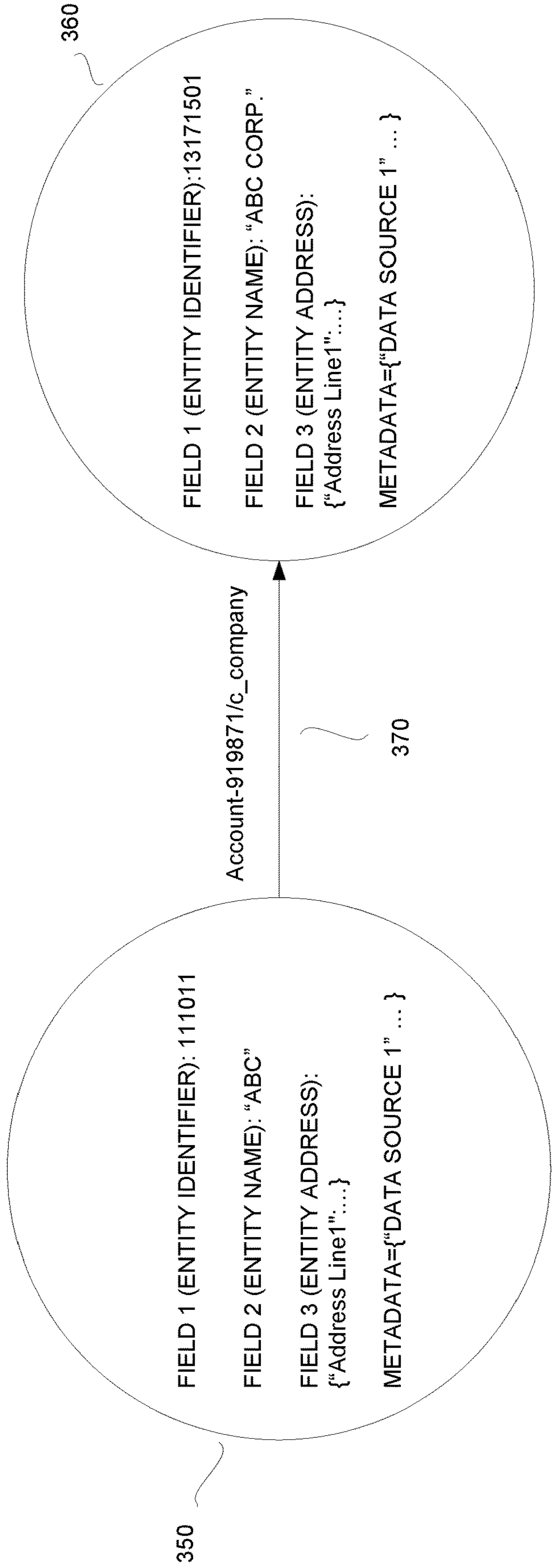
FIG. 3 illustrates an example of data of graph nodes of a data graph merged by a graph merge system, in accordance with one or more aspects of the disclosure.

FIG. 3 illustrates an example merge operation executed by the graph merge system (e.g., merge manager 116 of FIG. 1). In an embodiment, a first graph node 350 corresponding to the graph key is identified. In an embodiment, based on the reference data ("Account-919871/c_ompany"), a graph edge 370 is established with an existing graph node 360 corresponding to the Entity Identifier: 13171501 (e.g. as identified in the graph key field 219 shown in FIG. 2.

Figure 4:
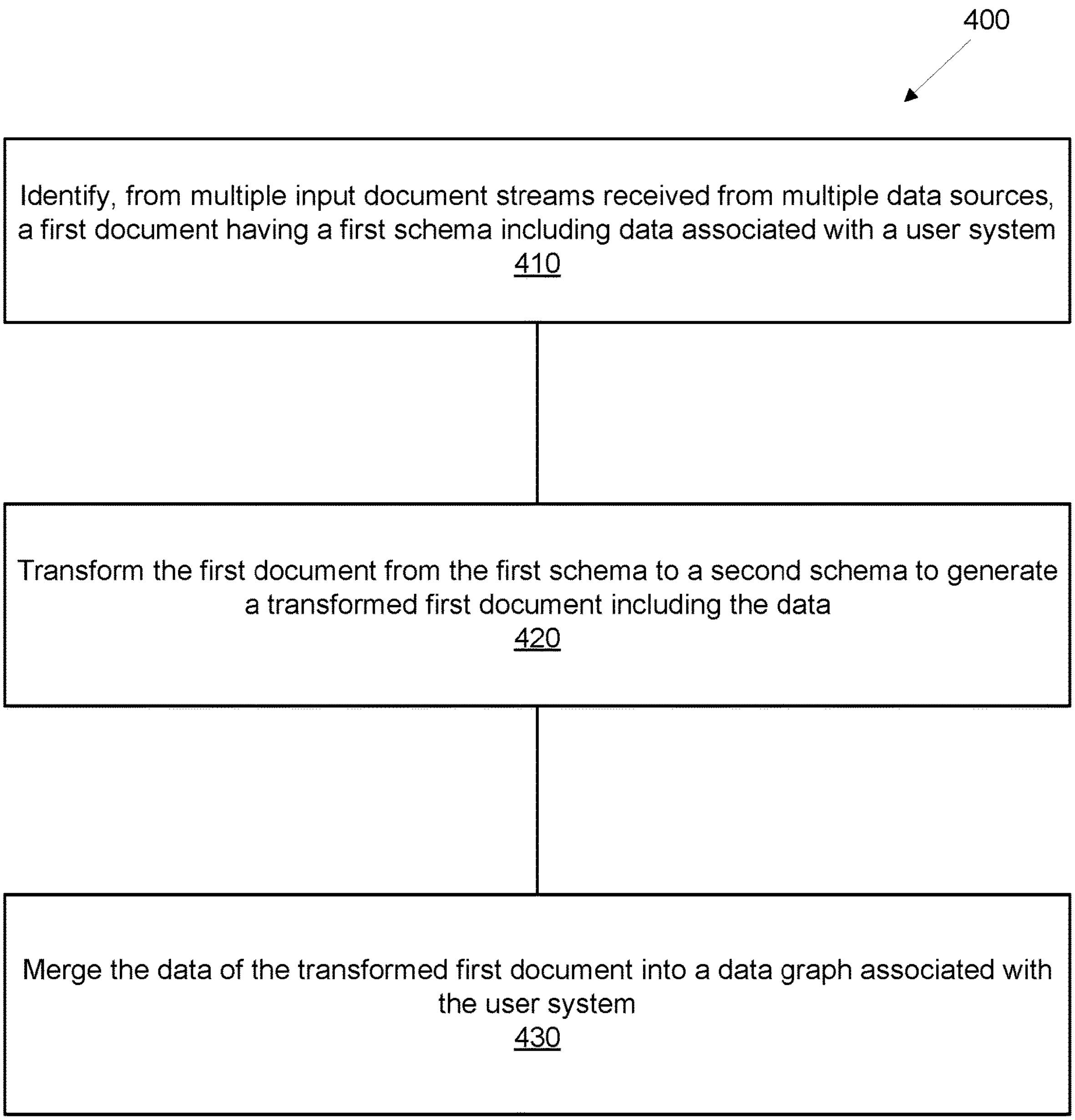
FIG. 4 illustrates an example method including merging data of input documents received via multiple input document streams associated with multiple data sources, in accordance with one or more aspects of the disclosure.

FIG. 4 illustrates a flow diagram relating to an example method 400 including operations performed by a graph merge system (e.g., graph merge system 110 of FIG. 1), according to embodiments of the present disclosure. It is to be understood that the flowchart of FIG. 4 provides an example of the many different types of functional arrangements that may be employed to implement operations and functions performed by one or more modules of the graph merge system as described herein. Method 400 may be performed by a processing logic that may comprise hardware (e.g., circuitry, dedicated logic, programmable logic, microcode, etc.), software (e.g., instructions run on a processing device), or a combination thereof. In one embodiment, the graph merge system executes the method 400 to process multiple input document streams received from multiple data sources and apply input schema transformation processing to enable merging of document data into a data graph associated with a user system for persistence in a graph database In operation 410, the processing logic identifies, from multiple input document streams received from multiple data sources, a first document having a first schema including data associated with a user system. In an embodiment, the multiple input data streams (e.g., input data stream 1, input data stream 2 . . . input data stream N of FIG. 1) include respective input document messages that are received by the processing logic of the graph merge system. In an embodiment, the received document messages are each configured in accordance with an associated schema. In an example, the first document is arranged in accordance with the first schema and includes data associated with the user system. In an embodiment, the processing logic reviews the document message with the first document to determine if the message includes a particular label value.

In operation 420, the processing logic transforms the first document from the first schema to a second schema to generate a transformed first document including the data. In an embodiment, a transformation function associated with the second schema can be maintained for execution in connection with a received document message (e.g., the first document). In an embodiment, the processing logic identifies a transformation function (and associated second schema) associated with the identified label value. In an embodiment, the processing logic executes the transformation function in response to identifying the particular label value in the document message including the first document. In an embodiment, execution of the transformation function results in the generation of the first document in the second schema (e.g., the transformed first document).

In operation 430, the processing logic merges the data of the transformed first document into a data graph associated with the user system. In an embodiment, multiple data graphs corresponding to respective user systems (e.g., a first data graph associated with user system 1, a second data graph associated with user system 2 . . . an Xth data graph associated with user system X) can be maintained and stored in a graph database (e.g., data graph database 117 of FIG. 1). In an embodiment, data of the transformed first document is merged into a corresponding data graph associated with the user system in a persistent graph database, as described and shown with reference to FIGS. 1-3.

In an embodiment, the graph merge system (e.g., the output document generator 118 of the graph merge system 110 of FIG. 1) is configured to generate a published output document stream for provisioning to a user system based on updates to the merged data graph associated with the user system. In an embodiment, the graph merge system maintains a set of one or more output specifications associated with a respective user system. In an embodiment, the set of one or more output specifications can be selected based on a label associated with the output specification. In an embodiment, each graph node is associated with a set of labels. In an embodiment, in response to an update of the data of a graph node is updated, one or more output specifications having a label that matches the one or more labels of the graph node are identified and applied. In an embodiment, each output specification can be configured to have a single label.

In an embodiment, an output specification defines or describes parameters of an output stream of document messages which the graph merge system generates and publishes to a user system. For example, an output specification can include information identifying an output name, an output schema (e.g., a description of how to compose the output document), an output label (e.g., the label is used to trigger the publication of an output document), a topic (e.g., identifying a destination onto which generated outputs are to be published), and a locale (e.g., information identifying the one or more locales for which the output document is to be generated.

In an embodiment, the label of the input message merged into the data graph (e.g., represented as a node in the data graph) is reviewed in accordance with the output specifications to determine if the label of the node matches the label identified in a output specification.

In an embodiment, the output document generator 118 determines when an output document is to be published to the user system. In an embodiment, the output document generator 118 determining whether the node has a label that matches an output specification. If no match is identified, then no output document is generated. If a match is identified, the output document generator 118 determines whether a field specified by the output schema has changed, updated, added or modified (collectively referred to as "updated") since a previous publication of the corresponding output document was generated. In an embodiment, if one or more fields of the output schema have been updated, a new output document message is created for the node. In an embodiment, if one or more fields of the output schema have not been updated (e.g., no field update is identified), then the output document generate 118 suppresses the publication of a new output document. Advantageously, according to embodiments, a new output document is published in response to determining a field contained in the output schema is updated. Accordingly, in an embodiment, the graph merge system can suppress (e.g., determine an output publication is not to be executed) in response to determining a field contained in the output schema has not been updated. In an embodiment, the management of the updates and determination whether one or more fields in the output schema associated with an output specification enables the selective publication of output documents including updated data, thereby resulting in computational efficiencies and savings. A further advantage is achieved by the graph merge system enabling a user system to receive published documents including updated data based on documents from multiple different data sources.

As shown in the example illustrated in FIG. 3, the graph merge system can review the merged data of the data graph and determine that node 350 includes updated information including the "entity address" field and the company reference as compared to the field values previously maintained in the data graph. In this example, as described above, the graph merge system determines whether an output specification includes a label that matches the "account-919871/example" label 218 of the extracted metadata 215 of the document message portions 204, as shown in FIG. 2. In an embodiment, the graph merge system can identify an output specification which was previously generated by the graph for this node. In an embodiment, upon identifying a corresponding output schema, the graph merge system can generate an output message including the updated data in accordance with the output schema of the identified output specification.

Figure 5:
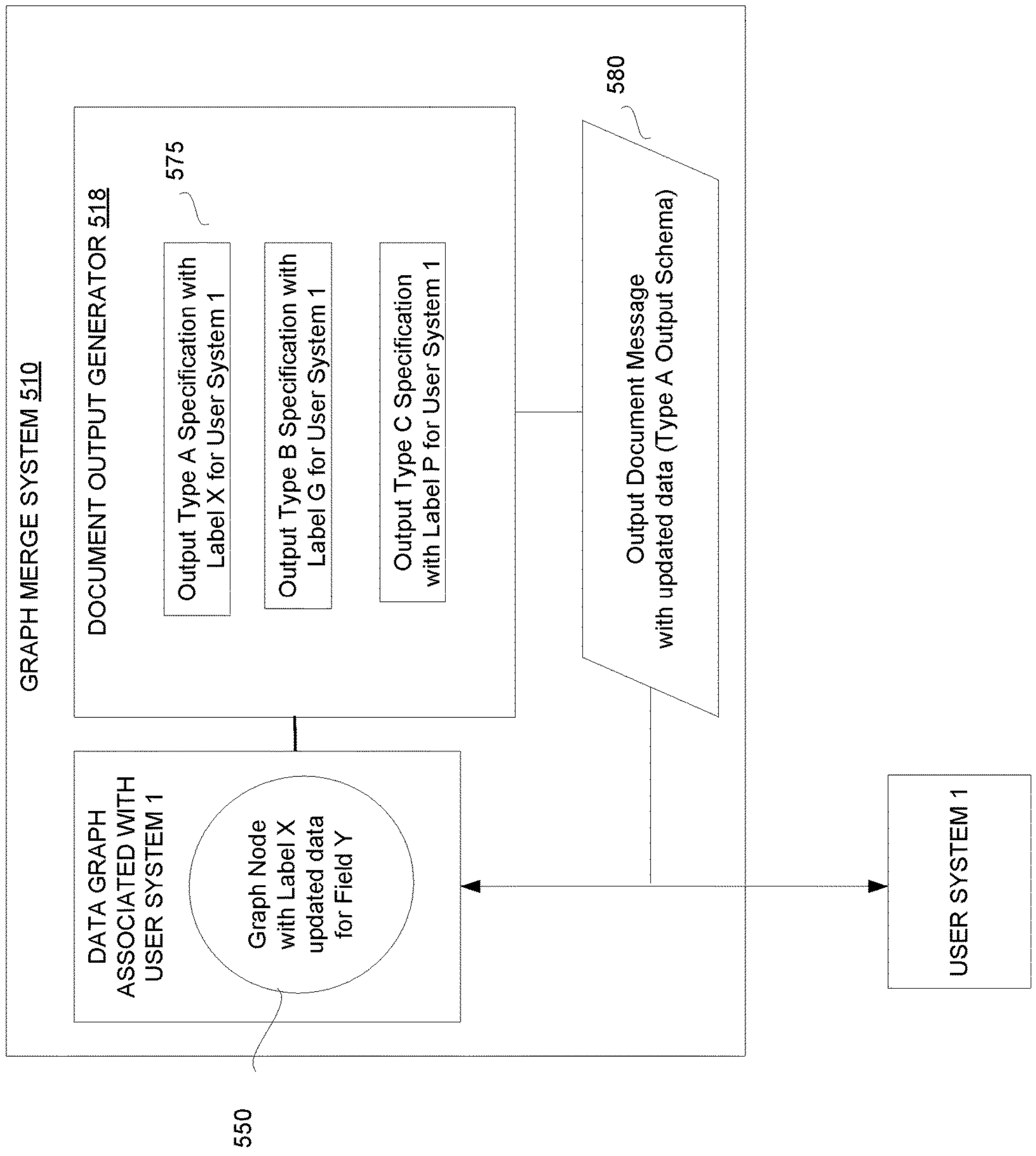
FIG. 5 illustrates an example graph merge system executing a method to generate an output document with updated data, in accordance with one or more aspects of the disclosure.

FIG. 5 illustrates an example generation of an output document message with updated data 580, according to embodiments of the present disclosure. As shown, a graph node 550 is processed and stored in a data graph associated with a user system (e.g., user system 1) in a data graph database (e.g., data graph database 117 of FIG. 1), as described in detail herein. In FIG. 5, a graph node 550 having a label value of "Label X" including updated data for Field Y is merged into the data graph associated with user system 1. In an embodiment, a document output generator 518 identifies a match of the graph node label (Label X) with an output specification (output specification type A) associated with user system 1. In an embodiment, in response to identifying the matching label, the document output generator 518 determines that the graph node 550 includes updated data for Field Y (e.g., the data is updated relative to a previous output document) which is included in the output schema associated with the output specification type A. In an embodiment, the document output generator 518 generates an output message 580 including the updated data for Field Y in accordance with the Type A output schema.

In an embodiment, a record of the generated output message is stored in the data graph. In an embodiment, the data graph encodes information including one or more of an identifier of the output specification used to generate the output message, information identifying a node serving as a document root for the output message, information identifying one or more field that are included in the output message, and a hash value of the output configuration body and output schema. In an embodiment, the document output generator 518 can use the encoded information when a publication of the output message is triggered or initiated in response to an update to a field value (e.g., an entity name field, a label associated with the output specification, etc.) an update to the output specification, an update to the output schema, etc. In an embodiment, an output document of the output stream of document messages is composed in accordance with the output schema of an output specification associated with the respective user system.

Figure 6:
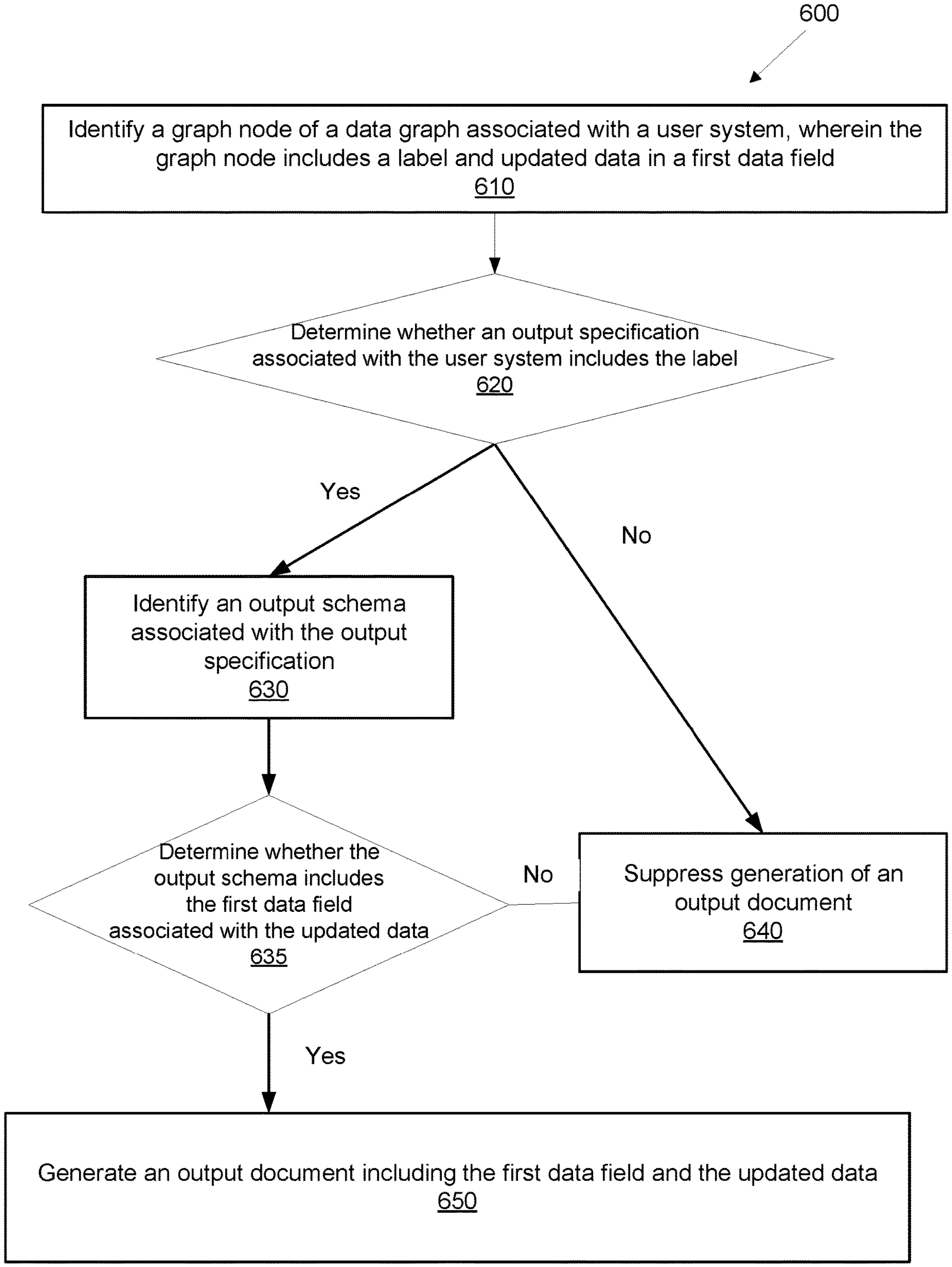
FIG. 6 illustrates an example method to determine whether to generate an output document or suppress generation of an output document including data associated with a graph node of a data graph, in accordance with one or more aspects of the disclosure.

FIG. 6 illustrates a flow diagram relating to an example method 600 including operations performed by a graph merge system (e.g., graph merge system 110 of FIG. 1), according to embodiments of the present disclosure. It is understood that the flowchart of FIG. 6 provides an example of the many different types of functional arrangements that may be employed to implement the operation of the notification management component as described herein. Method 600 may be performed by a processing logic that may comprise hardware (e.g., circuitry, dedicated logic, programmable logic, microcode, etc.), software (e.g., instructions run on a processing device), or a combination thereof. In one embodiment, the graph merge system executes the method 600 to generate an output document for publication to a user system.

In operation 610, the processing logic identifies a graph node of a data graph associated with a user system, wherein the graph node includes a label and updated data in a first data field. In operation 620, the processing logic determines whether an output specification associated with the user system includes the label. As described above, the processing logic determines if there is a matching label in one or more output specification associated with the user system.

In operation 630, in response to identifying an output specification having a label matching the graph node, the processing logic identifies an output schema associated with the identified output specification. In an embodiment, if in operation 620, no output specification having the matching label is identified, the processing logic suppresses generation of an output document for publication to the user system. In an embodiment, the suppression can include generating and storing a tag or other identifier representing that the label match check was performed and that no match was identified.

In an embodiment, the processing logic compares the existing data of a graph node to new or updated incoming data. In an embodiment, each field that has new data which is not equivalent is added to a set of "updated fields". In an embodiment, the set of updated fields is subsequently used to determine which of the one or more output specifications should be triggered for re-generation (e.g., generation of a published output document stream including the updated fields). For example, the processing logic may identify five output specifications that have a label that matches the updated graph node, wherein the schema associated with each of the five output specifications is different from one another. In this example, the processing logic may identify that a first output specification of the identified set of output specifications has a schema that includes one or more of the fields that has been updated (i.e., the updated fields). In this example, the first output specification is triggered and identified by the processing logic for the purposes of generating an output document in accordance with the first output specification. In this example, as described below, the remaining four output specifications that do not include any of the updated fields are suppressed (e.g., not triggered or used for the generation of an output document). In an embodiment, the processing logic can generate and store a record identifying the one or more output specifications that are triggered and the one or more output specifications that are suppressed.

In operation 635, in response to identifying the corresponding output schema in operation 630, the processing logic determines whether the output schema includes the first data field associated with the updated data. In an embodiment, if the identified output schema does not include the first data field, the processing logic suppresses generation of an output document associated with the graph node, in operation 640. In the example described above, the four output specifications that have output schemas that do not include any of the updated fields are suppressed by the processing logic (e.g., those output specifications are checked and a determination is made that they do not include the updated fields and no output document is generated in accordance with this subset of four output specifications.

In an embodiment, if the identified output schema includes the first data field, in operation 650, the processing logic generates an output document including the first data field and the updated data. In embodiment, the generated output document including the updated data of the graph node can be published to the user system.

Figure 7:
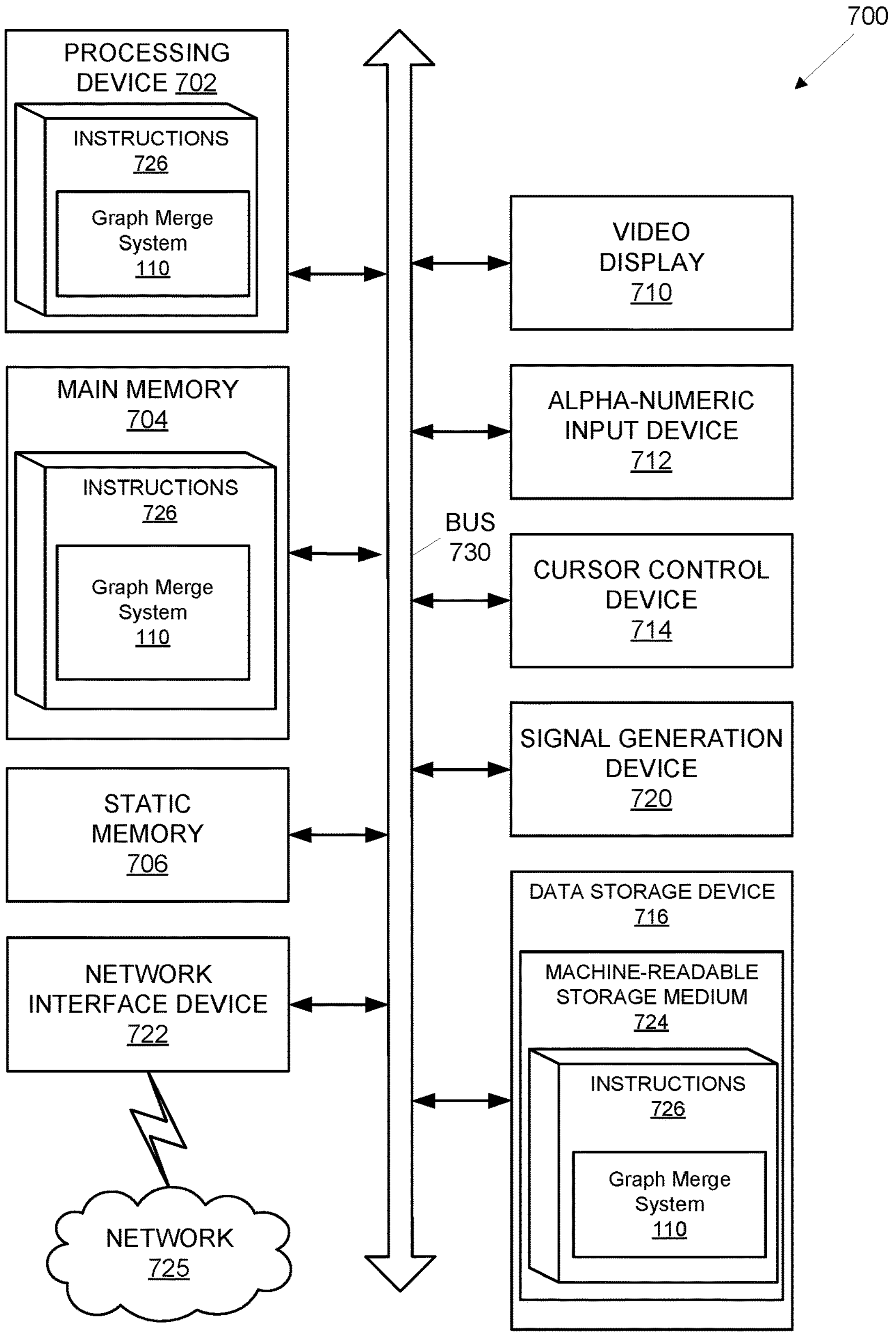
FIG. 7 illustrates an example computer system operating in accordance with some implementations.

FIG. 7 illustrates an example computer system 700 operating in accordance with some embodiments of the disclosure. In FIG. 7, a diagrammatic representation of a machine is shown in the exemplary form of the computer system 700 within which a set of instructions, for causing the machine to perform any one or more of the methodologies discussed herein, may be executed. In alternative embodiments, the machine 700 may be connected (e.g., networked) to other machines in a local area network (LAN), an intranet, an extranet, or the Internet. The machine 700 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 700. Further, while only a single machine is illustrated, the term "machine" shall also be taken to include any collection of machines that individually or jointly execute a set (or multiple sets) of instructions to perform any one or more of the methodologies discussed herein.

The example computer system 700 may comprise a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 716), which may communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute a search term management system for performing the operations and steps discussed herein. For example, the processing device 702 may be configured to execute instructions implementing the processes and methods described herein, for supporting a search term management system, in accordance with one or more aspects of the disclosure.

Example computer system 700 may further comprise a network interface device 722 that may be communicatively coupled to a network 725. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 720 (e.g., a speaker).

Data storage device 716 may include a computer-readable storage medium (or more specifically a non-transitory computer-readable storage medium) 724 on which is stored one or more sets of executable instructions 726. In accordance with one or more aspects of the disclosure, executable instructions 726 may comprise executable instructions encoding various functions of the graph merge system 110 in accordance with one or more aspects of the disclosure.

Executable instructions 726 may also reside, completely or at least partially, within main memory 704 and/or within processing device 702 during execution thereof by example computer system 700, main memory 704 and processing device 702 also constituting computer-readable storage media. Executable instructions 726 may further be transmitted or received over a network via network interface device 722.

While computer-readable storage medium 724 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "routing," "identifying," "generating," "providing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

identifying, from a plurality of input document streams received from a plurality of data sources, a first document having a first schema comprising first data associated with a first user system and a second document having the first schema comprising second data associated with a second user system, wherein the first data comprises one or more reference-type identifiers;

transforming, by a processing device, the first document from the first schema to a second schema associated with the first user system to generate a first transformed document comprising at least a portion of the first data;

identifying a first graph key associated with the first transformed document;

matching the first graph key to a graph node key associated with a first graph node of a first data graph associated with the first user system stored in a graph database;

merging the at least the portion of the first data of the first transformed document into the first graph node of the first data graph associated with the first user system;

determining that at least one of the one or more reference-type identifiers of the first data matches at least one entity identifier of an existing graph node;

establishing, in response to the determining, a graph edge between the first graph node and the existing graph node of the first data graph based on the one or more reference-type identifiers of the first data;

transforming the second document from the first schema to a third schema associated with the second user system to generate a second transformed document;

merging the second transformed document into a second data graph associated with the second user system;

identifying first updated data resulting from one or more updates to the first data;

identifying a set of updated fields of the first graph node based on the first updated data, the set of updated fields including a first field associated with the first updated data;

identifying a first label associated with the first graph node;

identifying a first and a second output specifications having respective specification labels matching the first label;

identifying a first output schema associated with the first output specification, wherein the first output schema includes the first field;

generating a first output document comprising the first data and the first updated data, the first output schema describing how to compose the first output document;

suppressing generation of a second output document for the first graph node in accordance with the second output specification, wherein a second output schema associated with the second output specification does not include the first field;

publishing the first output document to the first user system;

generating a second output document comprising second data from the second data graph in accordance with a second output schema associated with the second user system, the second output schema describing how to compose the second output document; and publishing the second output document to the second user system.

2. The method of claim 1, further comprising parsing the first document to identify a first graph key portion comprising the first graph key.

3. The method of claim 2, further comprising identifying the first graph node in the first data graph comprising a first graph node key matching the first graph key of the first transformed document.

4. The method of claim 3, further comprising parsing the first document to identify a first data portion comprising one or more data field-value pairs comprising updated data, a second data portion comprising the one or more reference-type identifiers, and third data portion comprising metadata corresponding to a first data source of the first document.

5. The method of claim 4, further comprising merging the first data portion, second data portion, and third data portion into the first graph node of the first data graph stored in the graph database.

6. The method of claim 1, further comprising:
identifying a label comprised within the metadata of the third data portion;
storing a set of output document specifications, wherein each of the set of output document specifications is associated with a specification label; and
determining the label matches a first specification label corresponding to a first output document specification of the set of output document specifications.

7. The method of claim 6, further comprising:
identifying the first output schema associated with the first output document specification.

8. A system comprising:
a memory to store instructions; and
a processing device, operatively coupled to the memory, to execute the instructions to perform operations comprising:
identifying, from a plurality of input document streams received from a plurality of data sources, a first document having a first schema comprising first data associated with a first user system and a second document having the first schema comprising second data associated with a second user system, wherein the first data comprises one or more reference-type identifiers;
transforming the first document from the first schema to a second schema associated with the first user system to generate a first transformed document comprising at least a portion of the first data;
identifying a first graph key associated with the first transformed document;
matching the first graph key to a graph node key associated with a first graph node of a first data graph associated with the first user system stored in a graph database;
merging the at least the portion of the first data of the first transformed document into the first graph node of the first data graph associated with the first user system;
determining that at least one of the one or more reference-type identifiers of the first data matches at least one entity identifier of an existing graph node;
establishing, in response to the determining, a graph edge between the first graph node and the existing graph node of the first data graph based on the one or more reference-type identifiers of the first data;
transforming the second document from the first schema to a third schema associated with the second user system to generate a second transformed document;
merging the second transformed document into a second data graph associated with the second user system;
identifying first updated data resulting from one or more updates to the first data;
identifying a set of updated fields of the first graph node based on the first updated data, the set of updated fields including a first field associated with the first updated data;
identifying a first label associated with the first graph node;
identifying a first and a second output specifications having respective specification labels matching the first label;
identifying a first output schema associated with the first output specification, wherein the first output schema includes the first field;
generating a first output document comprising the first data and the first updated data, the first output schema describing how to compose the first output document;
publishing the first output document to the first user system;
suppressing generation of a second output document for the first graph node in accordance with the second output specification, wherein a second output schema associated with the second output specification does not include the first field;
generating a second output document comprising second data from the second data graph in accordance with a second output schema associated with the second user system, the second output schema describing how to compose the second output document; and
publishing the second output document to the second user system.

9. The system of claim 8, the operations further comprising identifying a second graph node of the first data graph associated with the first user system, wherein the second graph node comprises a second label and second data in a second data field.

10. The system of claim 9, the operations further comprising:
determining a second output specification associated with the first user system does not include a specification label that matches the second label of the second graph node; and
suppressing generation of an output document corresponding to the second graph node.

11. The system of claim 9, the operations further comprising:
determining a second output specification associated with the first user system comprises a second specification label that matches the second label of the second graph node;
identifying a second output schema associated with the second output specification;
determining the second output schema does not comprise the second data field associated with the second data; and
suppressing generation of an output document corresponding to the second graph node.

12. A non-transitory computer readable storage medium comprising instructions that, when executed by a processing device, cause the processing device to perform operations comprising:
identifying, from a plurality of input document streams received from a plurality of data sources, a first document having a first schema comprising first data associated with a first user system and a second document having the first schema comprising second data associated with a second user system, wherein the first data comprises one or more reference-type identifiers;
transforming the first document from the first schema to a second schema associated with the first user system to generate a first transformed document comprising at least a portion of the first data;

identifying a first graph key associated with the first transformed document;

matching the first graph key to a graph node key associated with a first graph node of a first data graph associated with the first user system stored in a graph database;

merging the at least the portion of the first data of the first transformed document into the first graph node of the first data graph associated with the first user system;

determining that at least one of the one or more reference-type identifiers of the first data matches at least one entity identifier of an existing graph node;

establishing, in response to the determining, a graph edge between the first graph node and the existing graph node of the first data graph based on the one or more reference-type identifiers of the first data;

transforming the second document from the first schema to a third schema associated with the second user system to generate a second transformed document;

merging the second transformed document into a second data graph associated with the second user system;

identifying first updated data resulting from one or more updates to the first data;

identifying a set of updated fields of the first graph node based on the first updated data, the set of updated fields including a first field associated with the first updated data;

identifying a first label associated with the first graph node;

identifying a first and a second output specifications having respective specification labels matching the first label;

identifying a first output schema associated with the first output specification, wherein the first output schema includes the first field;

generating a first output document comprising the first data and the first updated data, the first output schema describing how to compose the first output document;

suppressing generation of a second output document for the first graph node in accordance with the second output specification, wherein a second output schema associated with the second output specification does not include the first field;

publishing the first output document to the first user system;

generating a second output document comprising second data from the second data graph in accordance with a second output schema associated with the second user system, the second output schema describing how to compose the second output document; and publishing the second output document to the second user system.

13. The non-transitory computer readable storage medium of claim 12, the operations further comprising:

further comprising parsing the first document to identify a first graph key portion comprising a first graph key.

14. The non-transitory computer readable storage medium of claim 13, the operations further comprising identifying a first graph node in the first data graph comprising a graph node key matching the first graph key of the first document.

15. The non-transitory computer readable storage medium of claim 14, the operations further comprising parsing the first document to identify a first data portion comprising one or more data field-value pairs comprising updated data, a second data portion comprising the one or more reference-type identifiers, and third data portion comprising metadata corresponding to a first data source of the first document.

16. The non-transitory computer readable storage medium of claim 15, the operations further comprising further comprising merging the first data portion, second data portion, and third data portion into the first graph node of the first data graph stored in the graph database.

* * * * *